(12) United States Patent
Weydert et al.

(10) Patent No.: US 7,193,004 B2
(45) Date of Patent: *Mar. 20, 2007

(54) PNEUMATIC TIRE HAVING A COMPONENT CONTAINING LOW PCA OIL

(75) Inventors: Marc Weydert, Luxembourg (LU); Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 369 days.

This patent is subject to a terminal disclaimer.

(21) Appl. No.: 10/610,189

(22) Filed: Jun. 30, 2003

(65) Prior Publication Data

US 2005/0009978 A1 Jan. 13, 2005

(51) Int. Cl.
  C08K 3/26 (2006.01)
  C08K 3/34 (2006.01)
  C08K 5/01 (2006.01)
(52) U.S. Cl. .................. 524/424; 524/476; 524/481; 524/493; 524/495
(58) Field of Classification Search ............... 524/424, 524/476, 481, 493, 495
  See application file for complete search history.

(56) References Cited

U.S. PATENT DOCUMENTS

| | | | |
|---|---|---|---|
| 3,985,701 A | 10/1976 | Schneider et al. | 260/33.6 |
| 4,108,730 A | 8/1978 | Chen et al. | 201/2.5 |
| 4,384,150 A | 5/1983 | Lyakhevich et al. | 585/241 |
| 4,866,131 A | 9/1989 | Fujimaki et al. | 525/96 |
| 5,091,007 A | 2/1992 | Hansen | 106/30 |
| 5,349,024 A | 9/1994 | Hergenrother et al. | 525/289 |
| 5,504,135 A | 4/1996 | Ardrizzi et al. | 524/484 |
| 5,998,513 A | 12/1999 | Hashimoto | 524/64 |
| 6,103,808 A | 8/2000 | Hasimoto | 524/484 |
| 6,146,520 A | 11/2000 | Gupte et al. | 208/322 |
| 6,242,523 B1 | 6/2001 | Blok et al. | 524/495 |
| 6,248,929 B1 | 6/2001 | Kaimai et al. | 585/241 |
| 6,399,697 B1 | 6/2002 | Takasaki et al. | 524/575 |
| 6,410,816 B2 | 6/2002 | Takasaki et al. | 585/833 |
| 6,602,942 B1 | 8/2003 | Karato | 524/474 |
| 6,608,145 B1 * | 8/2003 | Lin et al. | 525/332.6 |
| 6,822,043 B2 * | 11/2004 | Sohnen et al. | 524/592 |
| 2001/0007049 A1 | 7/2001 | Takasaki et al. | 585/833 |
| 2001/0023307 A1 | 9/2001 | Kaimai et al. | 585/241 |
| 2001/0045377 A1 | 11/2001 | Morishima et al. | 208/309 |
| 2002/0000280 A1 | 1/2002 | Scholl | 152/519 |
| 2002/0002244 A1 | 1/2002 | Hoelter et al. | 525/107 |
| 2002/0045697 A1 | 4/2002 | Sohnen et al. | 524/492 |
| 2002/0198296 A1 | 12/2002 | Rawlinson et al. | 524/173 |

FOREIGN PATENT DOCUMENTS

| | | |
|---|---|---|
| EP | 0 816 434 A1 | 1/1998 |
| EP | 0263885 | 4/1998 |
| EP | 0 839 891 A2 | 5/1998 |
| EP | 0940462 | 9/1999 |
| EP | 1391326 | 2/2004 |
| ES | 2 122 917 A1 | 12/1998 |
| GB | 688173 | 2/1953 |
| JP | 8269294 | 10/1996 |
| JP | 10158434 | 6/1998 |
| JP | 2002-97369 | 4/2002 |

OTHER PUBLICATIONS

European Search Report, Oct. 2004.

* cited by examiner

*Primary Examiner*—Kriellion Sanders
(74) *Attorney, Agent, or Firm*—John D. DeLong

(57) ABSTRACT

There is disclosed a pneumatic tire having a component comprising a vulcanizable rubber composition comprising, based on 100 parts by weight of elastomer (phr), from about 40 to about 90 phr of a solution polymerized styrene-butadiene having a styrene content of greater than 38 percent by weight; from about 10 to about 60 phr of at least one additional elastomer; and from about 10 to about 70 phr of a process oil having a glass transition temperature of from about −80° C. to about −40° C. and a polycyclic aromatic content of less than 3 percent by weight as determined by the IP346 method.

18 Claims, No Drawings

PNEUMATIC TIRE HAVING A COMPONENT CONTAINING LOW PCA OIL

BACKGROUND OF THE INVENTION

In compounding rubber and rubber composition for use in pneumatic tires, it is common to utilize processing oils to soften and extend the rubber. Typically, aromatic processing oils, having a certain content of polycyclic aromatic (PCA) compounds or polyaromatic hydrocarbons (PAH), have been used. Recently, regulatory concerns have necessitated the use of processing oils having a lower PCA content.

Rubber formulations used in various tire components previously have been designed using conventional processing oils. However, in changing to the use of the lower PCA content oils, some loss in rubber compound performance is noted. It is, therefore, necessary to develop new rubber compounds that provide desirable performance levels while incorporating the use of low PCA oils.

U.S. Pat. No. 5,504,135 discloses a rubber processing oil and rubber products containing it, wherein properties rubber compositions containing less than 3 percent polynuclear aromatic compounds (PNA) were inferior to properties of compounds made using conventional oils.

U.S. Pat. No. 6,103,808 discloses a high aromatic oil and rubber composition and oil extended synthetic rubber using the same.

U.S. Published Patent Application No. 2001/0023307 discloses a rubber process oil and production process thereof.

U.S. Published Patent Application No. 2002/0045697 discloses rubber mixtures for producing highly reinforced vulcanizates with low damping behavior, wherein a low PCA oil is used in tires showing reduced rolling resistance and high wet skid resistance. The rubber mixtures disclosed therein also contain at least one glyceride and/or a factice.

U.S. Published Patent Application No. 2002/0000280 discloses a rubber composition comprising a low PCA oil and at least one glyceride.

U.S. Pat. No. 6,399,697 discloses a process oil and rubber composition using the oil.

SUMMARY OF THE INVENTION

The invention is directed to a pneumatic tire having a component comprising a vulcanizable rubber composition comprising, based on 100 parts by weight of elastomer (phr), from about 40 to about 90 phr of a solution polymerized styrene-butadiene having a styrene content of greater than 38 percent by weight; from about 10 to about 60 phr of at least one additional elastomer; and from about 10 to about 70 phr of a process oil having a glass transition temperature of from about $-80°$ C. to about $-40°$ C. and a polycyclic aromatic content of less than 3 percent by weight as determined by the IP346 method.

DESCRIPTION OF THE INVENTION

There is disclosed a pneumatic tire having a component comprising a vulcanizable rubber composition comprising, based on 100 parts by weight of elastomer (phr), from about 40 to about 90 phr of a solution polymerized styrene-butadiene having a styrene content of greater than 38 percent by weight; from about 10 to about 60 phr of at least one additional elastomer; and from about 10 to about 70 phr of a process oil having a glass transition temperature of from about $-80°$ C. to about $-40°$ C. and a polycyclic aromatic content of less than 3 percent by weight as determined by the IP346 method.

The pneumatic tire of the present invention has at least one component comprising a vulcanizable rubber composition. In one embodiment, the vulcanizable rubber composition includes a high styrene styrene-butadiene rubber (SBR). In one embodiment, the high styrene SBR has a styrene content of greater than 38 percent by weight.

Such high styrene SBRs are well known in the art. High styrene SBR has been used mainly in racing applications due to their high grip, high traction properties. However, their use in passenger summer tires have been limited since such tires need to perform also at relatively low temperatures down to $0°$ C. Therefore, the use of such polymers in passenger tires has been limited to relatively small quantities, in formulations utilizing aromatic DAE type oils. It has now been found that rubber compounds containing low PCA oils including, but not limited to, TDAE, MES, Japanese TDAE, and heavy naphthenic oils, with lower glass transition temperature (Tg) than DAE oil, may comprise higher amounts of high styrene SBR and still reach a comparable compound Tg which will guarantee that the compound will still work effectively at lower temperatures such as encountered in the service life of a passenger tire. It has further been found that rubber compounds containing low PCA oils and high styrene SSBR do not require the use of glycerides and/or factices, therefore, the rubber compounds of the present invention are exclusive of glycerides and/or factices.

Suitable high styrene SBR may be produced by any of the synthesis methods as are known in the art. These methods include both emulsion and solution polymerization techniques, as, for example, taught in U.S. Pat. Nos. 6,372,863 and 6,455,655. High styrene solution polymerized SBR is available commercially as Enichem R74509; Goodyear X89137; Sumitomo SE8529; Dow SLR6610 and the like.

Suitable high styrene SBR will have a glass transition temperature, or Tg, in a range of from about $-10°$ C. to about $-25°$ C., expressed as the Tg midpoint for the non-oil extended polymer.

The vulcanizable rubber composition used in a tire component also includes a low PCA oil. Suitable low PCA oils include but are not limited to mild extraction solvates (MES), treated distillate aromatic extracts (TDAE), and heavy napthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about $-40°$ C. to about $-80°$ C. MES oils generally have a Tg in a range of from about $-57°$ C. to about $-63°$ C. TDAE oils generally have a Tg in a range of from about $-44°$ C. to about $-50°$ C. Heavy napthenic oils generally have a Tg in a range of from about $-42°$ C. to about $-48°$ C.

Suitable low PCA oils include those having a polycyclic aromatic content of less than 3 percent by weight as determined by the IP346 method.

In one embodiment, the low PCA oils may be an MES, TDAE or heavy napthenic types having characteristics as identified in the following table.

|  | MES | TDAE | Heavy Naphthenic |
|---|---|---|---|
| Aromatics % (2140) | 11–17 | 25–30 | 11–17 |
| Spec. Grav. @ 15° C. [kg/l] | 0.895–0.925 | 0.930–0.960 | 0.920–0.950 |
| Visc. 40° C. (cSt) | 150–230 | 370–430 | 350–820 |
| Visc. 100° C. (cSt) | 13–17 | 16–22 | 17–33 |
| Visc. Gravity Const. | 0.825–0.865 | 0.860–0.890 | 0.840–0.870 |
| Refractive Index | 1.495–1.510 | 1.520–1.540 | 1.500–1.520 |
| Tg [° C.]/inflection | −60 ± 3 | −47 ± 3 | −45 ± 3 |
| Aniline Point [° C.] | 85–100 |  |  |
| Pour Point [° C.] | 0 max | 30 max | 0 max |
| DMSO [%, IP 346] | <2.9 | <2.9 | <2.9 |
| Flashpoint [° C.] | >220 | >240 | >240 |

In one embodiment, the low PCA oils may be an MES type that is a complex combination of hydrocarbons predominantly comprised of saturated hydrocarbons in the range of $C_{20}$ to $C_{50}$ obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene.

Suitable MES oils are available commercially as Catenex SNR from Shell, Prorex 15 and Flexon 683 from ExxonMobil, VivaTec 200 from BP, Plaxolene MS from TotalFinaElf, Tudalen 4160/4225 from Dahleke, MES-H from Repsol, MES from Z8, and Olio MES S201 from Agip. Suitable TDAE oils are available as Tyrex 20 from ExxonMobil, VivaTec 500, VivaTec 180 and Enerthene 1849 from BP, and Extensoil 1996 from Repsol. Suitable heavy napthenic oils are available as Shellflex 794, Ergon Black Oil C1, Ergon Black Oil C2, Ergon H2000, Cross C2000, Cross C2400, and San Joaquin 2000L. The oils may be available as the oil alone or along an elastomer in the form of an extended elastomer, such as SLR6610MES from Dow.

In one embodiment, low PCA oil is used in an amount ranging from about 10 to about 70 phr. In another embodiment, low PCA oil is used in an amount ranging from about 20 to about 50 phr. The oil may be added either as free oil, or as an oil extended rubber.

Other elastomers that may be used along with the SBR may include various general purpose elastomers as are known in the art. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene, SBR, and natural rubber.

In one aspect the rubber to be combined with the SBR is preferably one or more diene-based rubbers. For example, one or more rubbers is preferred such as cis 1,4-polyisoprene rubber (natural or synthetic, although natural is preferred), 3,4-polyisoprene rubber, emulsion and solution polymerization derived styrene/isoprene/butadiene rubber, emulsion and solution polymerization derived styrene/butadiene rubbers, emulsion and solution polymerization derived isoprene/butadiene rubber, emulsion and solution polymerization derived styrene/isoprene rubber, cis 1,4-polybutadiene rubbers and emulsion polymerization prepared butadiene/acrylonitrile copolymers.

In another embodiment, the combination of SBR with the additional elastomer and low PCA oil is done such that the glass transition temperature Tg of the resulting combination of elastomers is within an acceptable range for use in a tire tread. Such a Tg may be obtained by utilizing a combination of additional elastomers to have Tg in a range of from about −20° C. to about −45° C.

In one embodiment, the vulcanizable rubber composition excludes glycerides and/or factices. Excluded glycerides include those known in the art including, but not limited to, rapeseed oil. Excluded factices include those disclosed in U.S. Published Application 2002/0045697, i.e. products of transformations and/or crosslinks of unsaturated animal, vegetable, or synthetic oils (e.g., rapeseed or castor oil) with sulfur, hydrogen sulfide, disulfide chloride, silicon tetrachloride, or diisocyanate.

The vulcanizable rubber composition may include from about 10 to about 100 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

The vulcanizable rubber composition may include from about 10 to about 100 phr of carbon black Commonly employed carbon blacks can be used as a conventional filler. Representative examples of such carbon blacks include N110, N121, N134, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

The vulcanizable rubber composition may include both silica and carbon black in a combined concentration of from about 20 to about 100 phr, in any weight ratio of silica to carbon black.

Other fillers may be used in the rubber composition including, but not limited to, particulate fillers including ultra high molecular weight polyethylene (UHMWPE); particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639. One or more other fillers may be used in an amount ranging from about 1 to about 20 phr.

It may be preferred to have the rubber composition for use in the tire component to additionally contain a conventional sulfur containing organosilicon compound. Examples of suitable sulfur containing organosilicon compounds are of the formula:

Z—Alk—$S_n$—Alk—Z    I in which Z is selected from the group consisting of

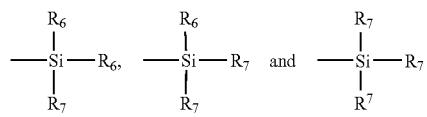

where $R_6$ is an alkyl group of 1 to 4 carbon atoms, cyclohexyl or phenyl; $R_7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis(tributoxysilylpropyl) disulfide, 3,3'-bis(trimethoxysilylpropyl)hexasulfide, 3,3'-bis(trimethoxysilylpropyl) octasulfide, 3,3'-bis(trioctoxysilylpropyl)tetrasulfide, 3,3'-bis(trihexoxysilylpropyl) disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl) pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl) trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl) trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl)tetrasulfide, 12,12'-bis(triisopropoxysilyl dodecyl) di sulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur-containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl) tetrasulfide. Therefore, as to formula I, preferably Z is

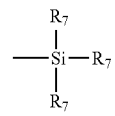

where $R_7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur-containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE

Five rubber compositions were prepared and comprised of the ingredients listed in Table 1. The rubber compositions were prepared by mixing the ingredients in one non-productive stage (without curatives) and a productive stage. The resulting compositions were cured under the same conditions of elevated temperature and pressure. Samples 1–4 are considered controls. Sample 5 (present invention) contained a high styrene ESBR and an MES type oil.

Table 2 illustrates the properties of the cured rubber compositions.

Table 3 illustrates tire performance data for P195/65R15 tires having treads made from the sample compounds and tested under standard conditions.

TABLE 1

| Sample | control 1 | control 2 | control 3 | control 4 | 5 |
|---|---|---|---|---|---|
| E-SBR[1] | 0 | 0 | 70 | 70 | 0 |
| S-SBR, med styrene[2] | 70 | 70 | 0 | 0 | 0 |
| S-SBR, high styrene[3] | 0 | 0 | 0 | 0 | 70 |

TABLE 1-continued

| Sample | control 1 | control 2 | control 3 | control 4 | 5 |
|---|---|---|---|---|---|
| PBD[4] | 30 | 30 | 30 | 30 | 30 |
| DAE Oil[5] | 26.25 | 0 | 26.25 | 26.25 | 0 |
| MES Oil[6] | 0 | 26.25 | 0 | 0 | 26.25 |
| Silica | 86 | 86 | 86 | 86 | 85 |
| Coupling Agents[7] | 13.8 | 13.8 | 13.8 | 13.8 | 13.6 |
| Stearic Acid | 3 | 3 | 3 | 3 | 3 |
| Zinc Oxide | 2.5 | 2.5 | 2.5 | 2.5 | 2.5 |
| Antidegradants[8] | 3 | 3 | 3 | 3 | 3 |
| Waxes | 1.8 | 1.8 | 1.8 | 1.8 | 1.5 |
| Accelerators[9] | 4 | 4 | 4 | 4 | 3.7 |
| Sulfur | 1.4 | 1.4 | 1.4 | 1.4 | 1.7 |

[1]Emulsion polymerized styrene butadiene rubber, about 41 weight percent styrene, of the type obtainable as 1721 from the Dow Chemical Company
[2]SE SLR-4610, solution polymerized styrene butadiene rubber, about 26 weight percent styrene, obtained from the Dow Chemical Company
[3]SE SLR-6610, solution polymerized styrene butadiene rubber, about 45 weight percent styrene, obtained from the Dow Chemical Company
[4]cis 1,4-polybutadiene rubber obtained as Budene ® 1207 from The Goodyear Tire & Rubber Company.
[5]highly aromatic process oil
[6]Catenex SNR, available from Shell
[7]including bis-(3-triethoxysilylpropyl)disulfide and bis-(3-triethoxysilylpropyl)tetrasulfide (50% active) commercially available from Degussa under the designation X50S which is a 50/50 by weight blend of the tetrasulfide with N330 carbon black
[8]phenylene diamine type
[9]sulfenamides and guanidines

TABLE 2

| Sample | 1 | 2 | 3 | 4 | 5 |
|---|---|---|---|---|---|
| Rheometer (150° C.) | | | | | |
| $T_{25}$ (min) | 5.3 | 5.8 | 5.4 | 5.4 | 6.7 |
| $T_{50}$ (min) | 6.7 | 7.6 | 6.5 | 6.5 | 8.9 |
| $T_{90}$ (min) | 13.8 | 14.6 | 11.6 | 11.2 | 18.4 |
| Max Torque (dNm) | 20.7 | 20.9 | 18.1 | 17.8 | 22.4 |
| Stress Strain | | | | | |
| Tensile Strength (MPa) | 16.9 | 16.1 | 18.5 | 18.5 | 17.7 |
| Elong Break (%) | 445.7 | 446.7 | 591.6 | 611.7 | 529.2 |
| Ratio Modulus | 5.1 | 4.9 | 4.3 | 4.3 | 4.5 |
| Shore A | 65.4 | 66.8 | 66.1 | 66.9 | 69 |
| 100% Mod (MPa) | 2 | 2 | 1.9 | 1.9 | 2 |
| 200% Mod (MPa) | 5.3 | 5.1 | 4.5 | 4.3 | 5 |
| 300% Mod (MPa) | 10.7 | 10 | 8.6 | 8.2 | 9.5 |
| Rebound | | | | | |
| 23° C. (%) | 30.8 | 32.3 | 27.1 | 28.3 | 21.8 |
| 100° C. (%) | 61.8 | 60.1 | 57 | 55.6 | 55.3 |

TABLE 3

| | | | | | |
|---|---|---|---|---|---|
| rolling resistance | 106 | 106 | 100 | 100 | 102 |
| wet braking | 98 | 97 | 100 | 100 | 107 |
| wet handling | 99 | 96 | 100 | 100 | 103 | samples 1 and 2 normalized to sample 3;
sample 5 normalized to sample 4

The above data in Table 2 demonstrates that the present invention (Sample 5) combines the advantage of the high styrene SSBR and MES oil, having a high rebound at 100° C. which is beneficial for rolling resistance and a low rebound at 23° C., which is beneficial for wet grip. Sample 5 also provides excellent tensile strength values without giving up the desired Shore A hardness values. High tensile strength values predict beneficial handling properties while high hardness values predict improved traction. The rolling resistance and wet handling values shown in Table 3 further evidences the advantage of Sample 5. Sample 5 shows an excellent balance of rolling resistance and wet grip properties as compared with the controls.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a component comprising a rubber composition comprising, based on 100 parts by weight of elastomer (phr),
   from about 40 to about 90 phr of a solution polymerized styrene-butadiene having a styrene content of greater than 38 percent by weight and a glass transition temperature of from about −10° C. to about −25° C.;
   from about 10 to about 60 phr of at least one additional elastomer; and
   from about 10 to about 70 phr of a process oil having a glass transition temperature of from about −80° C. to about −40° C. and a polycyclic aromatic content of less than 3 percent by weight as determined by the IP346 method;
   wherein said rubber composition is exclusive of glycerides and factices.

2. The pneumatic tire of claim 1, wherein said process oil is selected from mild extraction solvates (MES), treated distillate aromatic extracts (TDAE), and heavy napthenic oils.

3. The pneumatic tire of claim 1, wherein said process oil is a mild extraction solvate (MES) having a glass transition temperature in a range of from about −57° C. to about −63° C.

4. The pneumatic tire of claim 1, wherein said process oil is a treated distillate aromatic extract (TDAE) having a glass transition temperature in a range of from about −44° C. to about −50 ° C.

5. The pneumatic tire of claim 1, wherein said process oil is a heavy naphthenic oil having a glass transition temperature in a range of from about −42° C. to about −48° C.

6. The pneumatic tire of claim 1, wherein said process oil contains not more than 1 mg/kg of benzo(a)pyrene, and not more than a total of 10 mg/kg of polycyclic aromatic compounds selected from benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene.

7. The pneumatic tire of claim 1, wherein said composition further comprises a filler selected from carbon black, silica, polymer gels, and plasticizer/starch composites.

8. The pneumatic tire of claim 1, wherein said composition further comprises from about 10 to about 100 phr of carbon black.

9. The pneumatic tire of claim 1, wherein said composition further comprises from about 10 to about 100 phr of precipitated silica.

10. The pneumatic tire of claim 1, wherein said composition further comprises from about 20 to about 100 phr of carbon black and silica.

11. The pneumatic tire of claim 1, wherein said composition further comprises from about 1 to about 20 phr of a starch/plasticizer composite filler.

12. The pneumatic tire of claim 1, wherein said at least one additional elastomer is selected from the group consisting of cis 1,4-polyisoprene rubber (natural or synthetic), 3,4-polyisoprene rubber, emulsion and solution polymeriza tion derived styrene/isoprene/butadiene rubber, emulsion and solution polymerization derived styrene/butadiene rubbers, emulsion and solution polymerization derived isoprene/butadiene rubber, emulsion and solution polymerization derived styrene/isoprene rubber, cis 1,4-polybutadiene rubbers and emulsion polymerization prepared butadiene/acrylonitrile copolymers.

13. The pneumatic tire of claim 1, wherein said at least one additional elastomer includes polybutadiene.

14. The pneumatic tire of claim 1, wherein said component is a tread cap, tread base, or sidewall.

15. The pneumatic tire of claim 1, wherein said composition further comprises a silane coupling agent.

16. The pneumatic tire of claim 1, wherein said composition further comprises a sulfur-containing organosilane of the formula

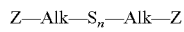

in which Z is selected from the group consisting of

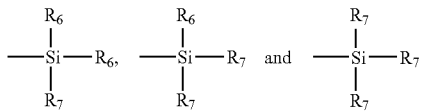

where $R_6$ is an alkyl group of 1 to 4 carbon atoms, cyclohexyl or phenyl; $R_7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

17. The pneumatic tire of claim 1, wherein said composition comprises from about 20 to about 50 phr of a process oil having a glass transition temperature of from about −80° C. to about −40° C. and a polycyclic aromatic content of less than 3 percent by weight as determined by the IP346 method.

18. The pneumatic tire of claim 1, wherein said rubber composition has a glass transition temperature ranging from about −20° C. to about −45° C.

* * * * *